United States Patent
Polette

(10) Patent No.: US 6,581,246 B1
(45) Date of Patent: Jun. 24, 2003

(54) ADJUSTABLE GRASS TRIMMER HANDLE

(76) Inventor: Robert Reid Polette, 17155, SW. Florence, Aloha, OR (US) 97007

( * ) Notice: Subject to any disclaimer, the term of this patent is extended or adjusted under 35 U.S.C. 154(b) by 0 days.

(21) Appl. No.: 09/970,102

(22) Filed: Oct. 2, 2001

(51) Int. Cl.[7] .................. B25G 1/04; A45C 13/22
(52) U.S. Cl. .................. 16/429; 16/426; 16/437; 16/444; 16/900; 16/DIG. 41
(58) Field of Search .................. 16/429, 422, 426, 16/436, 437, 444, 445, 446, 900, DIG. 41; 30/276, 298, 121; 56/1, 12.1, 12.7, DIG. 18; 7/167; 294/19.1, 57, 58, 59; 74/551.8, 551.9

(56) References Cited

U.S. PATENT DOCUMENTS

| | | | | |
|---|---|---|---|---|
| 1,534,075 A | * | 4/1925 | Parrish .................. | 16/426 |
| 4,225,104 A | * | 9/1980 | Larson .................. | 16/422 |
| 5,054,830 A | * | 10/1991 | Nisenbaum .................. | 16/426 |
| 5,133,582 A | * | 7/1992 | Rocha .................. | 16/426 |
| 5,496,085 A | * | 3/1996 | Middleton .................. | 16/426 |
| 5,499,852 A | * | 3/1996 | Seigendall .................. | 294/54.5 |
| 5,661,960 A | * | 9/1997 | Smith et al. .................. | 30/276 |
| 5,669,101 A | * | 9/1997 | Aiyama et al. .................. | 16/426 |
| 5,725,422 A | * | 3/1998 | Leweck .................. | 16/426 |
| 6,283,522 B1 | * | 9/2001 | Renaud .................. | 294/58 |

* cited by examiner

*Primary Examiner*—Chuck Y. Mah

(57) ABSTRACT

A grass trimmer adjustable handle has a two piece clamp with four bolts and four nuts for mounting and fastening to a grass trimmer main power shaft, and a rod end bearing with a threaded rod and a lock nut. The main handle has threads that match the threaded rod end bearing so that the handle can be adjusted in length to the desired height and reach, limited by the rod threads. The handle can be rotated on its axis and locked into position with the locking nut to fit the angle of the hand of the user, and tilts side to side for a better angle control of the trimmer in relation to the surface of the ground. The handle can move forward and backward in alignment with the main power shaft for better control of the height of the cutting head of the trimmer in relation to the surface of the ground.

1 Claim, 6 Drawing Sheets

ADJUSTABLE GRASS TRIMMER HANDLE

BACKGROUND OF THE INVENTION

This invention relates generally to the field of handles, and more particularly to an adjustable grass trimmer handle.

Grass and weed trimmers generally consist of electric or gas engines, and an elongated shaft for transmitting power to the cutting head of the trimmer. Trimmers have a trigger control as part of the elongated power shaft assembly and a nonadjustable or limited adjustable handle attached to the shaft. These handles are limited in scope and as such, the trimmer handle can not be fully adjusted to the individual user.

When using existing grass trimmers, a user has very little control of cutting height or side to side tilt of the cutting head. Most existing trimmer handles can cause fatigue and back problems for some individual users because the user has to adjust to the trimmer handle, as the trimmer handle can not be adjusted to the individual.

SUMMARY OF THE INVENTION

An object of the invention is to provide a handle for a grass trimmer, which can be adjusted both in length and on its axis for the individual user.

Another object of the invention is to make a correction over existing handles that can cause fatigue and back problems for the user.

Another object of the invention is to provide the user better control while trimming the grass because it tilts approximately ten degrees side to side from the center position, which in turn causes the cutting head to a limited degree of tilt, thus preventing the cutting line of the cutting head from digging into the ground.

A further object of the invention is to provide a height adjustable handle to personalize the grass trimmer for tall, medium or short people.

Yet another object of the invention is to provide a handle that tilts forward or backward in alignment with the trimmers main power shaft for a controlled raising or lowering of the cutting head.

Still yet another object of the invention is to provide a handle grip that can be rotated on its axis and locked at any angle which will be a comfortable fit for the hand of each individual user.

In accordance with a preferred embodiment of the present invention, a grass trimmer adjustable handle comprises a two piece clamp which clamps the devise to a grass trimmer main power shaft, a bolt and nut to fasten the rod end bearing to the two piece clamp, a rod end bearing with a threaded rod and a lock nut, a handle which has threads to match the threaded rod end bearing and a grip for the user to hold on to. The handle can be adjusted to fit the individual user's height and reach, the handle can also be rotated on its axis to fit the angle of the hand of the user and locked into that position by the locking nut. The handle tilts side to side approximately ten degrees due to the side to side movement of the threaded rod end bearing which in turn gives better control of the side to side tilt of the cutting head of the trimmer in relation to the surface of the ground, and the handle can be moved forward and backward in alignment with the trimmer main power shaft because of the action of the rod end bearing for a better control of the height of the cutting head of the trimmer in relation to the ground.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which maybe embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
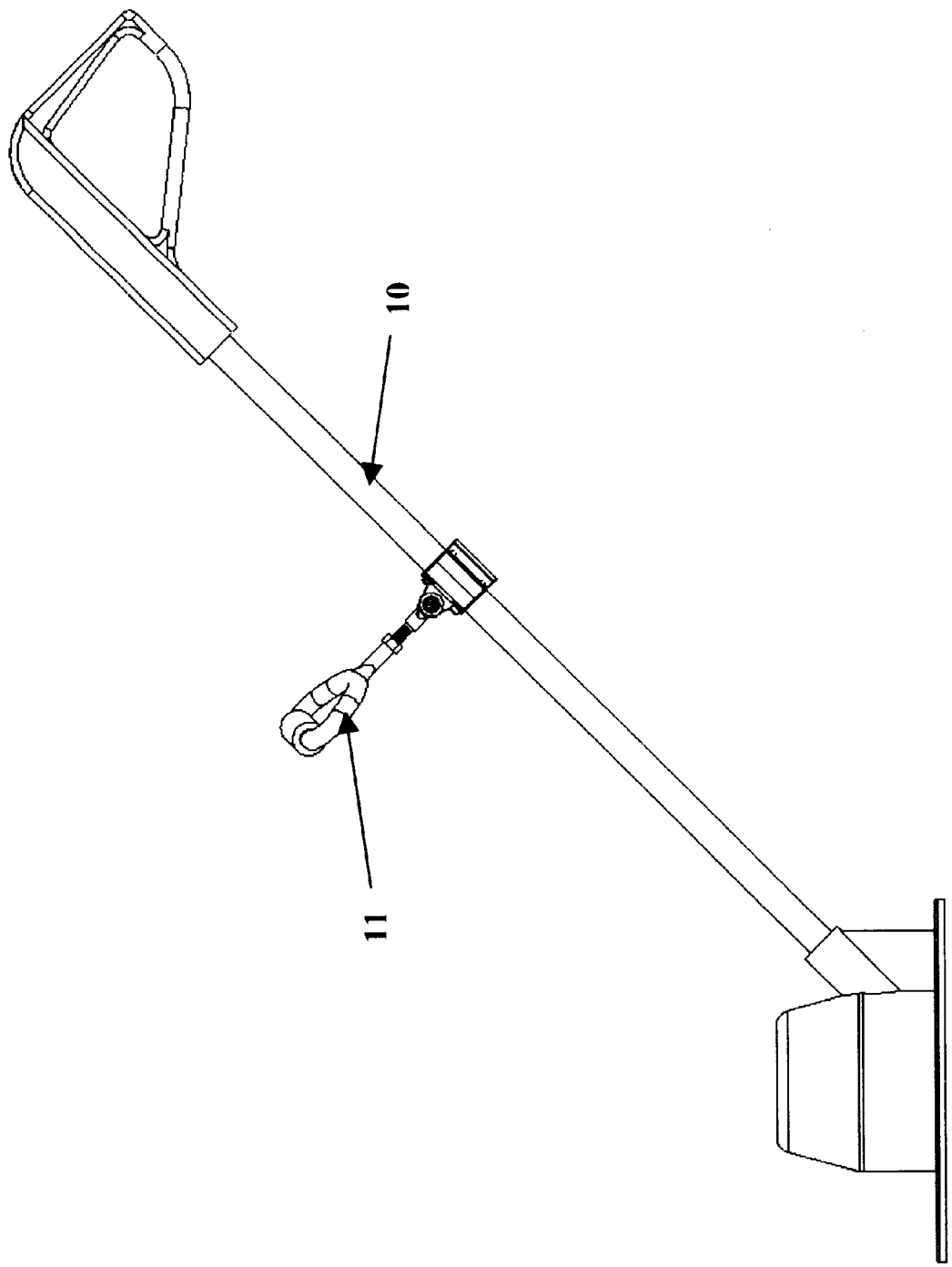
FIG. 1 is a side view of the trimmer with the adjustable handle when attached to the elongated shaft of the trimmer in accordance with the preferred embodiment of the present invention.

Referring now to the drawings, FIG. 1 grass trimmer 10 is shown and includes an embodiment of the present adjustable grass trimmer handle assembly 11.

Figure 2:
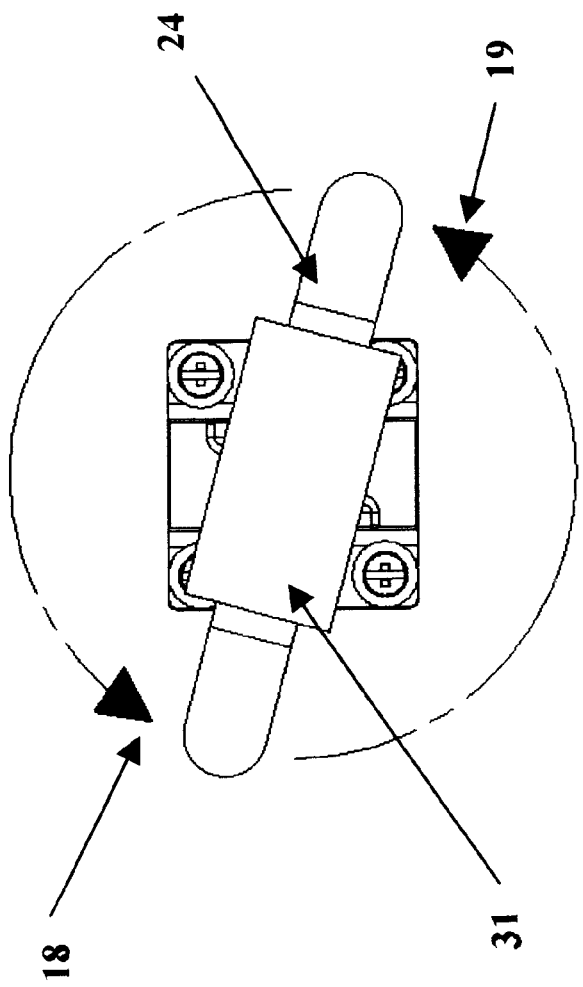
FIG. 2 is a top view of the adjustable handle and the rotational action about the vertical axis.

As shown in FIG. 2, a top view of the adjustable handle, grip 31 of handle 24 can be rotated about its axis in a clockwise or counterclockwise direction, as depicted by 18 and 19 so as to position the angle of the grip 31 that will comfortably fit the angle of the hand of the individual user when using the trimmer. After the grip 31 is comfortably positioned, lock nut 20 is tightened against the handle 24 to lock the angle in position, as seen in FIG. 3.

Figure 3:
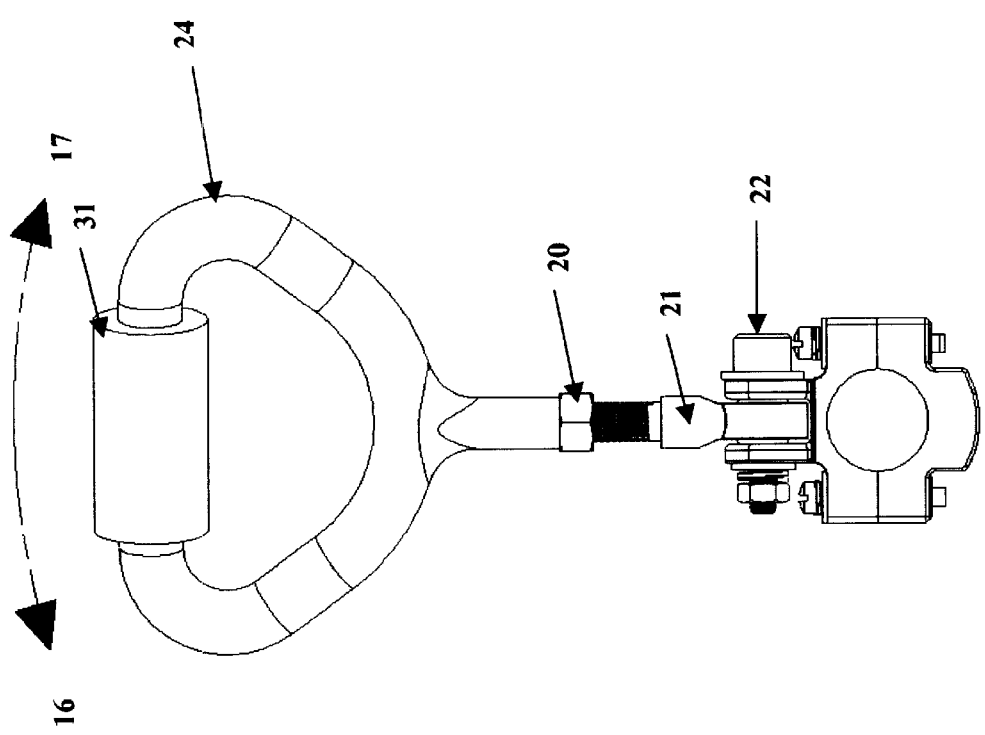
FIG. 3 is a frontal view of the handle in the vertical position with the side to side movement.

FIG. 3 shows a frontal view of the side to side movement as depicted by 16 and 17 of approximately ten degrees due to the action of the rod end bearing 21. The side to side movement gives approximately a ten-degree tilt control of the trimmers cutting head in relation to the surface of the ground so as not to dig into the surface of the ground when sweeping the trimmer back and forth in a cutting action The ten degree tilt is accomplished by rotating the wrist of the user's trigger hand which is holding the main power shaft of the trimmer 10, while holding the grip 31 with the other hand in a steady position.

Figure 4:
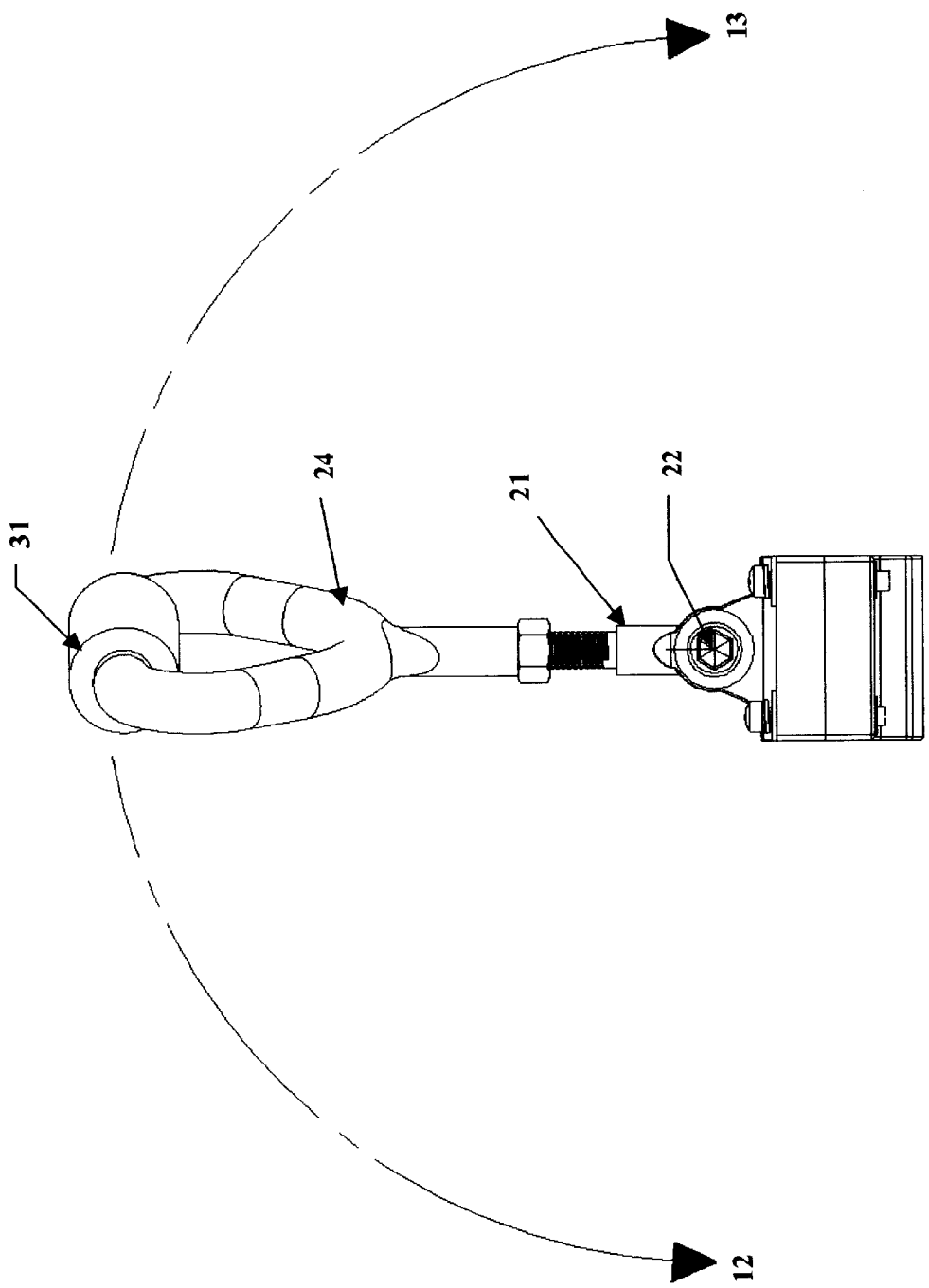
FIG. 4 is a side view of the handle in the vertical position with the fore and aft movement in relation to the shaft of the trimmer.

FIG. 4 shows a fore and aft movement, numbers 12 and 13, in relation to the trimmer shaft 11. This action is the result of the movement of the rod end bearing 21 around the through bolt 22. This movement allows the user to easily raise or lower the cutting head of the trimmer in relation to the surface of the ground with precise control. By moving the handle 24 forward, the cutting head will automatically be lowered closer to the surface of the ground and by moving the handle 24 aft, the cutting head will automatically be raised higher from the surface of the ground.

Figure 5:
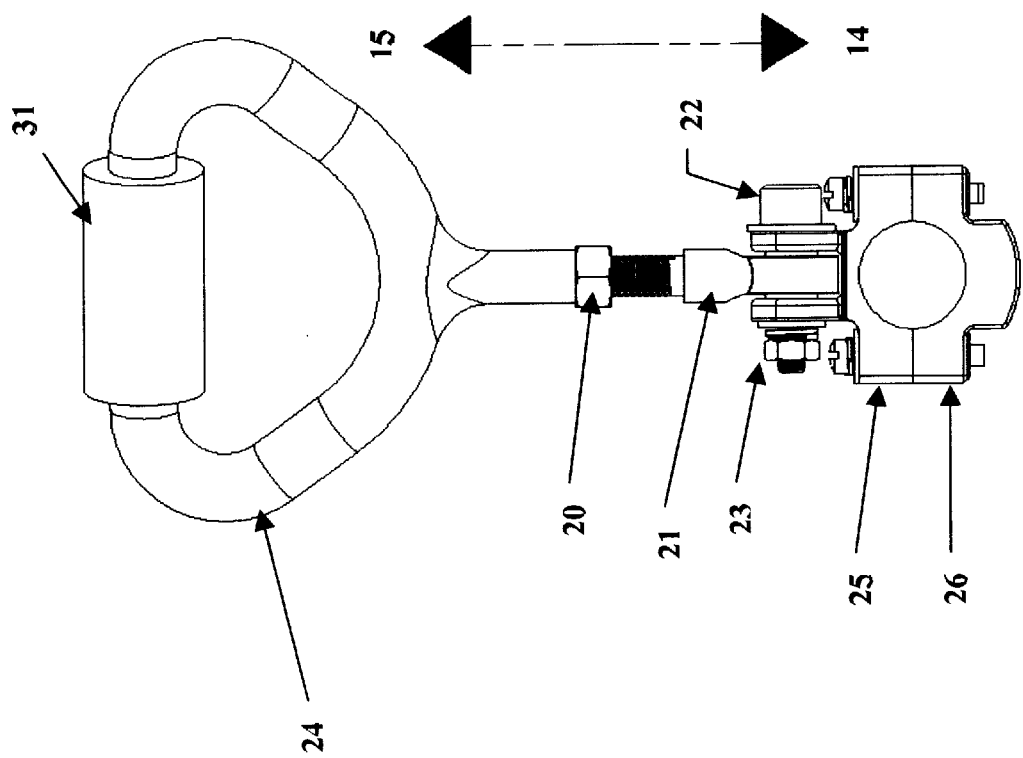
FIG. 5 is the handle in the vertical position showing the adjustable height movement.

FIG. 5 illustrates the height adjustment, numbers 14 and 15, which is adjusted by loosening lock nut 20 and rotating the handle 24 clockwise or counterclockwise on the threaded rod end bearing which will lengthen or shorten the handle 24 to the required height as determined by the individual user. Once the height is adjusted, lock nut 20 is then tightened up against handle 24, thus locking the height position of the handle to fit the user. This adjustment is made by the user to adjust the height of the cutting head to the surface of the ground when holding the trimmer in a cutting position. The purpose of the adjustment is because different users have different heights and reaches. The adjustment is limited only by the length of the threaded rod end bearing.

Figure 6:
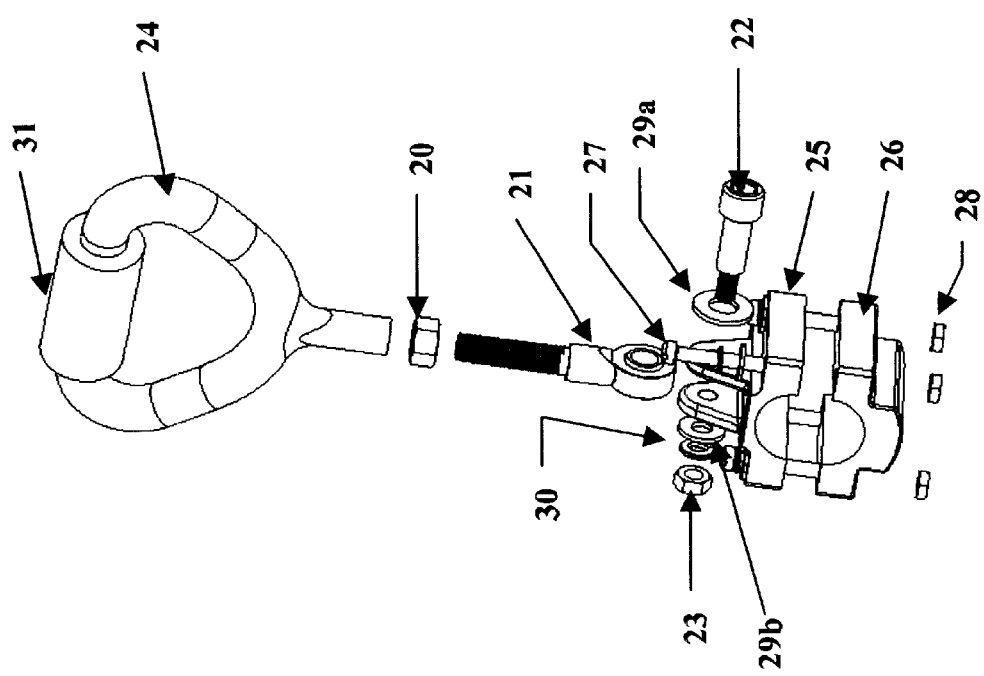
FIG. 6 is an exploded view of all the parts of the adjustable handle.

FIG. 6 shows an exploded view of all parts of the adjustable handle as per the following: lock nut 20, rod end bearing 21, through bolt 22, nut 23, handle 24, top clamp 25, bottom clamp 26, clamp bolts 27, clamp bolt nuts 28, through bolt washer 29a, through bolt washer 29b, through bolt lock washer 30, and grip 31.

While the invention has been described in connection with a preferred embodiment, it is not intended to limit the scope of the invention to the particular form set forth, but contrary, it is intended to cover such alternatives, modifications, and equivalents as may be included within the spirit and scope of the invention as defined by the appended claims.

What I claim as my invention is:

1. A grass trimmer having an adjustable handle comprising:

a two piece releasable clamp to clamp the handle to the grass trimmer main power shaft at a fixed position along the main power shaft;

a bolt and nut to attach the clamp to a rod end bearing;

a rod end bearing with a threaded rod and a lock nut, the rod end bearing allowing a limited range of pivotal movement of the threaded rod about the main power shaft, and a main handle with threads to match the threaded rod end bearing and with a grip for the user to hold:

so that the handle can be adjusted lengthwise of the threaded rod to fit the individual user's height and reach, the handle can be rotated on about the central axis of the threaded rod and locked in position by the locking nut to fit the angle of the hand of the user, the other hand which holds the trimmer main power shaft tilts the main power shaft side to side to better control the angle of the cutting head of the trimmer in relation to the surface of the ground and the handle can be moved forward and backward along the alignment of the trimmer main power shaft and because of the action of the rod end bearing, giving the user a better control of the height of the cutting head of the trimmer in relation to the surface of the ground.

* * * * *